June 6, 1961 R. B. MATTHEWS 2,987,117
GAS TURBINE CONTROL APPARATUS
Filed April 3, 1957
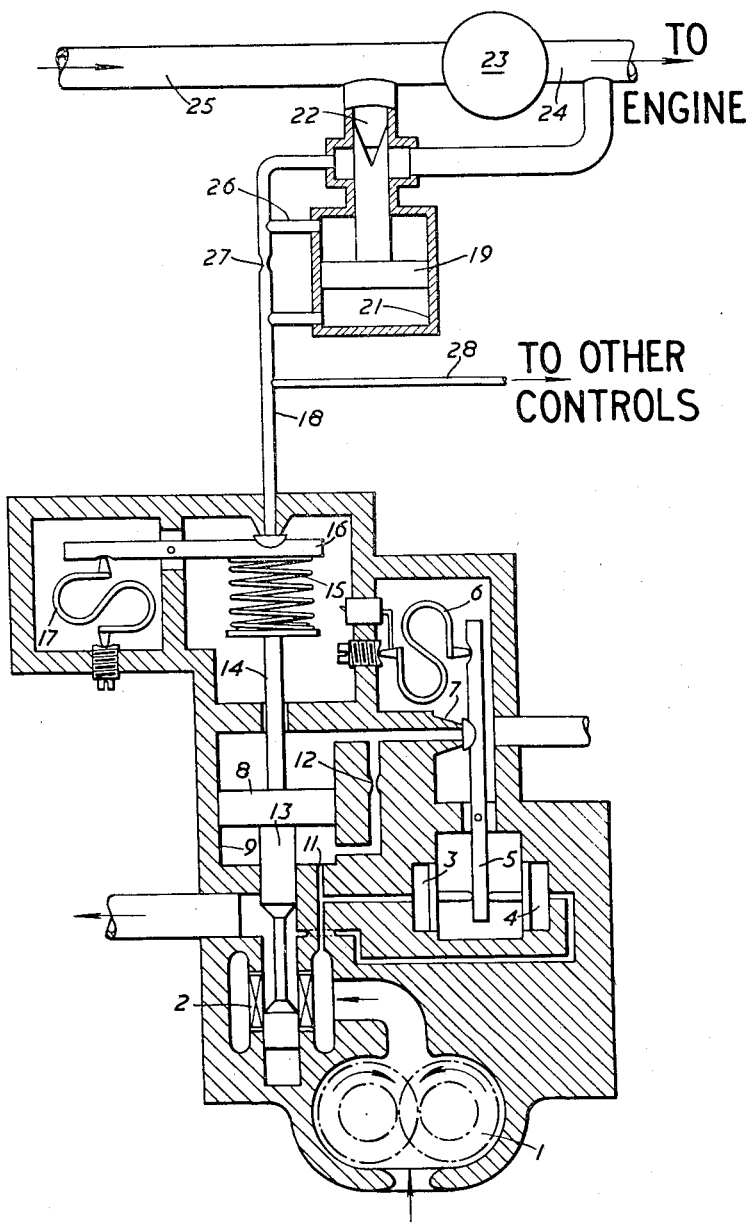
INVENTOR
ROBERT B. MATTHEWS
BY
Reynolds, Beach &
Christman
ATTORNEYS

United States Patent Office 2,987,117
Patented June 6, 1961

2,987,117
GAS TURBINE CONTROL APPARATUS
Robert B. Matthews, Cheltenham, England, assignor to Dowty Fuel Systems Limited, Cheltenham, England
Filed Apr. 3, 1957, Ser. No. 650,453
Claims priority, application Great Britain Apr. 6, 1956
4 Claims. (Cl. 158—36.4)

This invention relates to control apparatus for use with aircraft jet propulsion gas turbine engines having fixed characteristics. The object of the invention is to provide an apparatus operative during constant speed running to take action to reduce fuel supply when the turbine entry temperature reaches a dangerous level. Normally, turbine entry temperature is too high to be reliably measured by any accepted system and there is always the danger that if this temperature is allowed to become too high for more than a short period then the turbine blades will distort under centrifugal action and possibly the rotor will break up. It is not unusual for turbine entry temperature to rise to a high level during engine acceleration, but since accelerations last only for short periods the danger is not great since the opportunity is not provided for the turbine blades to rise to the dangerously high temperature. However, for constant speed running it is possible when altering altitude and/or when the compressor inlet temperature alters for the turbine entry temperature to rise to a dangerous level and to stay at that level for a long period whereby the turbine blades may rise to that dangerous temperature. The object of the present invention is to provide an apparatus to compute when a dangerous turbine temperature is attained during constant running conditions whatever the conditions of operation might be and to take automatic action to reduce fuel supply if a dangerous temperature is attained.

The present invention comprises the provision of a simple computing apparatus which is fed with easily measurable dimensional variables of the performance of the gas turbine to be controlled, from which the dangerous turbine entry temperature may be computed, and means operable at this dangerous temperature to reduce or limit the fuel supply to the engine. The variables fed to the computing apparatus are gas turbine rotational speed N and compressor inlet temperature $T_1$ from which the apparatus is arranged to compute the non-dimensional parameter $N/\sqrt{T_1}$. This parameter for its higher values at which dangerous turbine temperatures are likely to develop has an approximately unique relation during steady state operation with the ratio between turbine entry temperature $T_3$ and compressor entry temperature $T_1$ i.e. $T_3/T_1$, and a cam or shaped valve opening or the like may be used to facilitate generation of the ratio $T_3/T_1$ from the parameter $N/\sqrt{T_1}$. Having generated this ratio it is possible to multiply it by $T_1$ which is already supplied to the apparatus leaving the value $T_3$.

In order that the invention may be clearly understood one embodiment thereof will be described by way of example with reference to the accompanying diagrammatic drawing.

In this embodiment the apparatus is operated hydraulically, liquid fuel conveniently forming the working liquid. A small engine-driven gear pump 1 supplies liquid at a rate Q which is proportional to engine speed N. This liquid is passed through a port 2 of variable area A and the pressures on each side of this port are fed to pressure pads 3 and 4 which act oppositely on a first pivoted lever 5. A Bourdon tube 6 which exerts a greater or lesser force in accordance with temperature $T_1$ also acts on this first lever. This first lever controls a servo vent opening 7 leading from a piston and cylinder 8 and 9 which in turn act to vary the area of the port 2. Power required to actuate this piston and cylinder is very small and is obtained from pressure liquid supplied by the gear pump. This pressure liquid is fed directly to one side of the piston through passage 11 and through a restriction 12 to the other side of the piston. The servo vent 7 extends from the other side of the piston and the amount of opening of the servo vent determines the flow through the restriction 12 and the pressure which is applied to the other side of the piston. The piston 8 is connected to a piston valve 13 which moves to vary the effective area of port 2. The piston valve 13 subtracts from the effective piston area over which pump pressure acts and a greater area of the other side of the piston is available on which the vent-controlled pressure acts whereby equilibrium can be established for any position of the piston.

A small diameter piston rod 14 extends from the other side of the piston through the end of the cylinder 9 and compresses a spring 15 against a second pivoted lever 16. A further Bourdon tube 17 acting in accordance with $T_1$ acts on this second lever in opposition to the spring. The lever itself controls a servo vent 18 extending from a servo piston and cylinder 19 and 21 which control the fuel by-pass valve 22 for the fuel pump 23 supplying the gas turbine. The by-pass valve 22 is directly connected to control flow of fuel from the outlet 24 back to the inlet 25 of pump 23. Valve 22 extends from piston 19 and reduces the area of one side of this piston as compared with the other side. Piston 19 is servo-operated by pressure fuel taken from output 24. Full pressure is fed to the smaller area of piston 19 by pipe 26 whilst the larger area is fed through restriction 27. The servo vent 18 extends from the restriction 27. Other controls for fuel flow (not herein shown) act on servo vent passage 28 in parallel with servo vent 18, and the flow through passage 28 is normally accurately controlled in accordance with the desired conditions of operation of the gas turbine. Thus the piston 19 normally takes up a balanced position to effect a fuel by-pass which allows the correct rate of flow of fuel to the engine. The servo vent 18 is normally held closed by lever 16 so as not to control fuel flow, but in high speed conditions if turbine entry temperature $T_3$ becomes excessive vent 18 will open to cause extra flow through restriction 27 and consequent movement of the by-pass valve 22 to a more open position whereby less fuel is delivered to the engine.

In operation the rate of flow Q of liquid through the port 2 produces a pressure drop $\Delta P$ in accordance with the expression $$N \alpha Q \alpha A \sqrt{\Delta P} \tag{1}$$

By the arrangement of the first pivoted lever 5 a balance between $\Delta P$ and $T_1$ is obtained to give the expression $$\Delta P \alpha T_1 \tag{2}$$

By combining Expressions (1) and (2) the following expression is obtained $$A \alpha N/\sqrt{T_1} \tag{3}$$

The travel $t$ of the piston valve 13 measured from the closed position of the port 2 bears a fixed relation to the area A of the port.

The compression spring is an ordinary helical spring where compression is linearly related to load L. In the present case the load is at a maximum when $t=0$. The second lever 16 is arranged to be in a state of balance to open the by-pass servo vent when the load L bears a definite relation to the opposed Bourdon tube loading which is controlled by $T_1$. The port is so shaped as to take account of the unique relation between $N/\sqrt{T_1}$ and $T_3T_1$ in the higher ranges of $N_2\sqrt{T_1}$ and the arrangement of the spring relative to piston movement $t$ so that the following expression is obtained $$L \alpha T_1/T_3 \quad (4)$$

At the position of balance of the second lever 16 when the by-pass servo vent 18 is about to open the following relation prevails.

$$T_1/T_3 \alpha T_1 \quad (5)$$

from which it follows that when balance of the second lever 16 occurs $T_3$ has a definite value. Adjustments are provided for the Bourdon tubes and the spring so that balance of the second lever and consequent opening of the fuel by-pass servo vent occurs at a predetermined danger value of $T_3$.

I claim as my invention:

1. A fuel supply system for a jet propulsion gas turbine engine having fixed characteristics, including a computing means for dangerous turbine entry temperatures comprising a liquid displacement means adapted to be driven by the engine, an adjustable throttle through which liquid is driven by the displacement means, a servo motor to adjust the throttle, a control for the servo motor such that the pressure drop across the throttle bears a predetermined relation to compressor inlet temperature, and control means to reduce fuel flow when the ratio between compressor inlet temperature and adjustment of the throttle, which is proportional to turbine entry temperature, exceeds a certain value.

2. A fuel supply system as claimed in claim 1, wherein the control for the servo motor comprises a pivoted lever operative to move the servo motor in either direction in accordance with its deflection from a predetermined position, a pair of pressure pads fed with pressures from either side of the throttle to produce a twisting moment on the lever in one direction and a Bourdon tube fed with pressure in accordance with compressor inlet temperature and arranged to exert an opposite twisting moment on the lever whereby the servo motor adjusts the throttle to a size to cause the moment exerted by the pressure pads to balance the moment exerted by the Bourdon tube with the result that adjusting movement of the throttle for higher engine speeds is proportional to the ratio of turbine entry temperature and compressor inlet temperature.

3. A fuel supply system as claimed in claim 2, including a fuel supply pump, a servo-operated by-pass valve for the fuel supply pump, a stop, a second pivoted lever engageable on said stop and arranged such that movement from the stop will control the by-pass valve to cause greater by-pass of fuel, a spring loaded against the second lever by movement of the throttle and a second Bourdon tube fed with pressure in accordance with compressor inlet temperature acting on the second lever in opposition to the spring whereby at a predetermined ratio of moments exerted on the second lever by the spring and the Bourdon tube, which represents the predetermined turbine entry temperature, the second lever will move from the stop and cause reduction of fuel supplied to the engine.

4. A fuel system for a jet propulsion gas turbine engine having fixed characteristics comprising engine speed (N) sensing means, engine compressor inlet temperature ($T_1$) sensing means, a servo mechanism controlled jointly by N and $T_1$ to produce a first load in accordance with the parameter $N/\sqrt{T_1}$ a second engine compressor inlet temperature ($T_1$) sensing means producing a second load in accordance with $T_1$, a valve operative to reduce fuel supply to the engine, and operating means for said valve, the respective loads being arranged for application in opposing senses to said operating means, said operating means being constructed to compare the ratio of the respective loads and open said valve when a certain ratio is reached, whereby the fuel flow is limited to a value below that which will produce a dangerously high turbine inlet temperature.

References Cited in the file of this patent

UNITED STATES PATENTS

| 2,638,742 | Carey | May 19, 1953 |
| 2,779,422 | Dolza et al. | Jan. 29, 1957 |

FOREIGN PATENTS

| 580,149 | Great Britain | Aug. 8, 1946 |

OTHER REFERENCES

NACA Report No. 896, dated March 4, 1948.